UNITED STATES PATENT OFFICE.

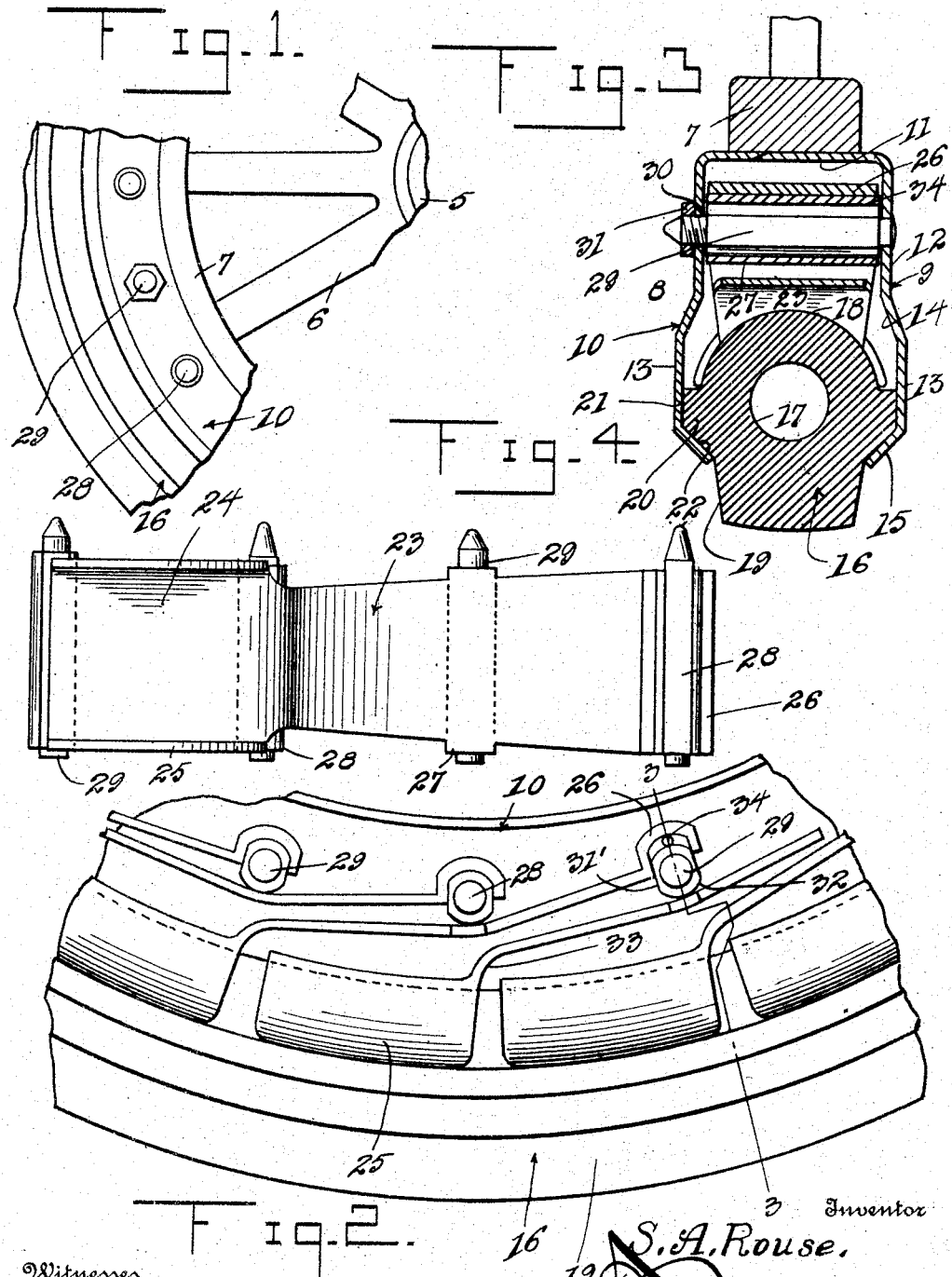

SEYMOUR A. ROUSE, OF CHICAGO, ILLINOIS.

CUSHION-TIRE.

1,183,595.  Specification of Letters Patent.  Patented May 16, 1916.

Application filed September 30, 1913. Serial No. 792,556.

*To all whom it may concern:*

Be it known that I, SEYMOUR A. ROUSE, a citizen of the United States, residing at Chicago, in the county of Cook and State of Illinois, have invented certain new and useful Improvements in Cushion-Tires; and I do hereby declare the following to be a full, clear, and exact description of the invention, such as will enable others skilled in the art to which it appertains to make and use the same.

This invention comprehends improvements in cushion tires for vehicles and relates more particularly to those of the type which include as component parts a tire proper, a tire rim or holder and metallic springs interposed between the tire and the inner wall of the rim or holder.

One of the objects of the invention is to provide a tire and cushioning means of this nature which shall be of extremely simple construction, very practical and fully as efficient as the pneumatic tire now generally used on motor vehicles.

Another object of the invention is to provide a cushion tire which may be readily assembled and which is so constructed as to permit of the various parts being easily reached for repairs or replacement, and which will be very strong and durable.

Another object of the invention is to provide a structure of this nature wherein springs are so designed and arranged that it is practically impossible to injure them by an excessive load and in which the tension of said springs may be easily adjusted.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a fragmentary side elevation, showing a portion of a wheel and my improved cushion tire secured thereto, Fig. 2 is an enlarged fragmentary view of one side of the tire with a section of the rim or holder removed, Fig. 3 is a transverse section taken on the plane of line 3—3 of Fig. 2, and Fig. 4 is an outside elevation of one of the springs, showing the relative positions of the stay-bolts with respect to said spring.

Referring in detail to the drawings by numerals, 5 designates a portion of a wheel hub, 6 the spokes of a wheel and 7 the felly. A tire rim or holder 8 formed in two sections 9 and 10 is mounted upon the felly 7. This rim or holder comprises an inner wall 11 which is opposed to the felly and the side walls 12, said walls being offset near their outer edges, as indicated by the numeral 13 so as to enlarge the chamber formed between them. Inwardly converging walls 14 connect the offset portions with the main portions of the rim and outwardly converging clamping sections 15 are formed adjacent the outer edges of the rim or holder. It will be noted that the section of the inner wall carried by the member 9 is somewhat wider than the section carried by the member 10, and that these two sections have their meeting edges beveled or biased.

A solid rubber tire, designated as an entirety by the numeral 16 and preferably formed with a circular bore or channel 17 is positioned between the side walls of the rim or holder and is formed with a convex inner wall 18 and outwardly converging side walls 19. The side walls are formed with annular projections 20 which have their side faces 21 parallel to and in engagement with the offset portions 13 of the holder and their outer faces 22 parallel to and adapted for engagement with the sections 15 of the holder.

To cushion the tire, I provide a plurality of springs, generally designated 23, each of said springs being formed with a head 24 upon one end and a clip 26 upon the other end. The head is transversely and longitudinally curved to conform with the curved face or wall 18 of the tire and is of such a width as to completely embrace the face 18. It will be noted, upon reference to Fig. 2, that the sides 25 of each of the heads are almost rectangular and present a large area for engagement with the tire. The clip 26, which is formed upon one end of each spring, is somewhat U-shaped in cross section, faces outwardly and is equal in length to the width of the spring. Upon reference to Fig. 4, it will be noted that the central portion of the spring tapers from the clip to the head 24 and that a laterally projecting lug 27 is formed upon each edge of the central portion, the outer edges of these lugs being disposed in the same planes as the ends of the clip.

To secure the springs in proper position and to hold the rim sections together, I employ a plurality of stay-bolts 28 and 29, said bolts being alternately arranged. All of the bolts are securely riveted to the section 9 of the holder by having their reduced ends extended through openings in said section and flattened, as shown in Fig. 3. The bolts extend transversely through the holder at a distance from the inner wall and have their other ends reduced in diameter and extended through openings 30 formed in the section 10. The bolts 29 are threaded upon one end for engagement with the nuts 31 which thread against the section 10 and lock it rigidly to the section 9. I find it is not necessary to secure nuts to all of the bolts, and for this reason I leave the bolts 28 unthreaded, as clearly shown in Fig. 4.

The clip of each spring is fitted over the inner side of one of the bolts, as is shown in Fig. 2, and said spring extends forwardly across the outer side of the next preceding bolt and then engages the tire, as clearly shown. It will be noted that the bolts are formed with straight parallel side faces 31' and curved outer and inner faces 32 so that the bolts fit closely within the clip and offer a large surface for engagement therewith. Each spring extends partly over or beyond the next preceding spring and has its head positioned about opposite the next two succeeding bolts, as will be evident upon reference to Fig. 4, and it will also be noted that the heads 24 of the springs are offset somewhat from the central portions thereof, as indicated by the numeral 33. The tension upon the springs may be adjusted by driving a pin or key, such as indicated by the numeral 34, between the clips and the bolts. The larger these pins are, the more they cause the springs to bear against their fulcrum bolts and against the inner side of the tire.

In assembling my cushion tire, all of the stay-bolts are first riveted securely to the section 9 of the rim or holder, and this section is then bolted or otherwise secured to the felly 7. The tire is then placed in position against the section 9 and the springs set in position by hand or by any other means. After these springs have been positioned, the tension thereof is increased by placing the pins 34 in position. Any suitable lever may be employed for separating the clips and bolts in order that these tension pins may be easily placed within the clips. The section 10 of the holder is then set in position and secured by the nuts 31.

In operation a pressure upon any section of the tire will force said section inwardly against the springs which are opposed thereto and these springs are of such a weight as to resist ordinary pressures without being bent to any great extent. The thickness of the tire prevents it from being flexed so sharply as to throw all of the load or strain upon one spring. If an excessive load is placed upon the springs, they are forced inwardly against the stay-bolts and against one another and therefore will not be injured in any way whatsoever. A heavy load also tends to flatten the tire and this is overcome by making the tire very thick where it engages the offset portions 13 and by having the heads 24 of the springs extend for quite a distance around the inner face of the tire. The clamping sections 15 of the rim or holder prevent the tire from becoming disengaged therefrom and also limit the outward movement thereof. The holder is so shaped as to prevent any lateral movement of the tire, but does not retard the movement thereof so as to properly absorb shocks and jars. The lugs 27, by engaging the sides of the rim or holder 8, hold the springs against lateral movement without offering much frictional resistance. If desired, some dry lubricant may be placed within the rim in order to cause all of the movable parts to work freely.

From the foregoing description taken in connection with the accompanying drawings, it will be evident that I have provided a very simple and practical cushion tire which will operate as effectually as a pneumatic tire and last very much longer.

While I have shown and described the preferred embodiment of my invention, it will be understood that minor changes in construction, combination and arrangement of parts may be made without departing from the scope and spirit of the invention as claimed.

Having thus described my invention, I claim:—

In a combination, a tire rim substantially U-shaped in cross section, bolts secured transversely in said rim, a tire extending around and spaced from said bolts, a U-shaped clip engaging the inner portion of each bolt, a leaf spring connected with one edge of each clip, engaging the outer portion of the adjacent bolt and the inner surface of the tire and being tapered from its inner to its outer end, and spacing lugs formed on the converging edges of said spring contacting the outer surface of the adjacent bolt and slidably engaging the inner surfaces of the sides of the tire rim to secure the spring against lateral movement.

In testimony whereof I affix my signature in presence of two witnesses.

SEYMOUR A. ROUSE.

Witnesses:
HENRY BRUNDER,
DEMETEING D. DEMETRAKALAY.

Copies of this patent may be obtained for five cents each, by addressing the "Commissioner of Patents, Washington, D. C."